United States Patent [19]

Rossner et al.

[11] 4,203,760

[45] May 20, 1980

[54] METHOD FOR PRODUCING STEEL FROM SPONGE METAL BY USING A GAS PLASMA

[75] Inventors: Heinrich-Otto Rossner; Henri F. Seelig, both of Essen, Fed. Rep. of Germany

[73] Assignee: Fried, Krupp Gesellschaft mit beschrankter Haftung, Essen, Fed. Rep. of Germany

[21] Appl. No.: 885,021

[22] Filed: Mar. 9, 1978

[30] Foreign Application Priority Data

Mar. 10, 1978 [DE] Fed. Rep. of Germany ....... 2710377

[51] Int. Cl.² ............................................. C21C 5/52
[52] U.S. Cl. ..................................................... 75/12
[58] Field of Search ..................... 75/10 R, 12, 13, 43, 75/11

[56] References Cited

U.S. PATENT DOCUMENTS

| | | | |
|---|---|---|---|
| 3,558,791 | 1/1971 | Grachev et al. | 75/10 R UX |
| 3,753,688 | 8/1973 | Cherny et al. | 75/43 |
| 3,771,585 | 11/1973 | Ulrich | 75/10 R |
| 3,843,352 | 10/1974 | Ulrich | 75/10 R |
| 3,964,897 | 6/1976 | Langhammer | 75/10 R |
| 4,083,715 | 4/1978 | Langhammer | 75/10 R |

*Primary Examiner*—M. J. Andrews
*Attorney, Agent, or Firm*—Spencer & Kaye

[57] ABSTRACT

Method for producing steel from sponge metal with the use of a gas plasma in a melting vessel containing a metal bath. The sponge metal is fed into the melting vessel and is melted directly by the plasma without the addition of base or acid means. The slag produced from the melting of the sponge metal is removed continuously from the metal bath.

6 Claims, 3 Drawing Figures

METHOD FOR PRODUCING STEEL FROM SPONGE METAL BY USING A GAS PLASMA

BACKGROUND OF THE INVENTION

The present invention relates to a method for the production of steel from sponge metal by using gas plasmas as the energy carrier.

German Pat. No. 2,149,407, corresponding to U.S. Pat. No. 3,843,352, to Klaus-Herbert Ulrich, discloses a method for melting sponge metal by means of gas plasmas in which the sponge-like raw material is introduced from the top into a melting vessel containing a metal bath which has a layer of slag on its top. The sponge metal has a lower density than the slag and therefore floats on the slag. A plasma is directed onto the melt from the top and thereby melts the sponge metal. The melted sponge metal has a greater density than the slag, and accordingly the melted sponge metal then drops through the liquid slag in the form of droplets into the metal bath. Impurities such as sulfur and phosphorus for example, originally contained in the sponge metal are absorbed by the slag. In this method, however, it is necessary to add to the melting vessel slag-forming substances including acidic and basic substances, and their liquefaction requires energy. The method of the present invention intends to overcome this drawback.

German Pat. No. 2,110,274, corresponding to U.S. Pat. No. 3,771,585, to Klaus-Herbert Ulrich, discloses an apparatus for melting sponge metal by means of inert gas plasmas. This process does not involve slag work, but the amount of apparatus required is very high, since the sponge metal must be cleaned under vacuum. The method of the present invention overcomes this drawback as well.

SUMMARY OF THE INVENTION

A primary object of the present invention is to provide a method for producing steels without the requirement for much apparatus and in an energy and cost conserving manner.

Additional objects and advantages of the present invention will be set forth in part on the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purpose, the present invention provides a method for producing steel from sponge metal, by the use of a gas plasma formed by a plasma burner, in a melting vessel into which the sponge metal is fed which comprises, directly melting the sponge metal that is fed into the melting vessel by the plasma without the addition of base or acid substances, and continuously removing from the metal bath the slag produced from the melting of the sponge metal.

According to the present invention, the plasma burner preferably is directed onto the metal bath at such an angle that the entire bath surface is covered by the plasma cone and only a very thin layer of the unmelted raw sponge metal is present on the metal bath surface.

In one embodiment of the present invention, the melted sponge metal in the metal bath is subjected to a subsequent treatment with deoxidation and alloying means. This treatment can be accomplished in a further or second vessel which is connected with the melting vessel. If, in addition, characteristic values, such as, for example, the oxygen potential and the temperature, are measured in the second vessel, these measured data provide a way to effect automatic control over the entire process.

It is to be understood that both the foregoing general description and the follwing detailed description are exemplary, but are not restrictive of the invention.

DETAILED DESCRIPTION OF THE INVENTION

The technique of melting in an electric arc furnace is known. In the electric arc furnace technique, slag producing materials such as acidic and basic agents must be added to the furnace and heated. The slag formed in the electric arc furnace removes impurities from the sponge metal. The process according to the present invention has the advantage, however, that no additional means for slag formation need be added and heated in order to clean the sponge metal. As compared to a 60-ton electric arc furnace which operates at a slag temperature of 1570° C., the energy savings which can be realized with the method of the present invention amounts to 1.08 kWh/kg slag. Further, with the method of the present invention, the high expenditures involved in a vacuum process can be eliminated and thus the present method has a cost reducing effect on the steel production.

The unmelted raw sponge metal material that is used in the present invention contains a matrix of impurities as well as sponge metal, and during the melting process there is an intensive separation of the matrix from the sponge metal. The raw sponge metal can, for example, be sponge iron or metals of Groups 4b or 5b of the periodic table, such as zirconium or titanium.

Due to the direct melting of the sponge metal by means of the plasma cone which causes the individual grains of the sponge metal to enter the metal bath as liquid drops and due to the intensive separation of the matrix from the sponge metal during the melting process, the method according to the present invention surprisingly produces very high degrees of desulfurization of about 75–95% and dephosphorization of greater than 50%. In addition, the method of the present invention produces few oxidic impurities in the steel which in the prior art methods are produced in larger quantities as a result of metal-slag reactions.

In an advantageous embodiment of the present invention, a second vessel is used into which the liquid metal is discharged in the same quantity as sponge metal is being melted. Data obtained by measurements in the second vessel can be used to control the entire steel production process according to the present invention. For example, when a given desired temperature is exceeded, either the sponge metal charging speed is increased or the amount of electrical energy supplied is reduced. Similarly, instead of measuring the temperature in the second vessel, the oxygen potential can be measured in the second vessel. In a similarly advantageous manner, the carbon content of the produced steel can also be influenced.

Figure 1:
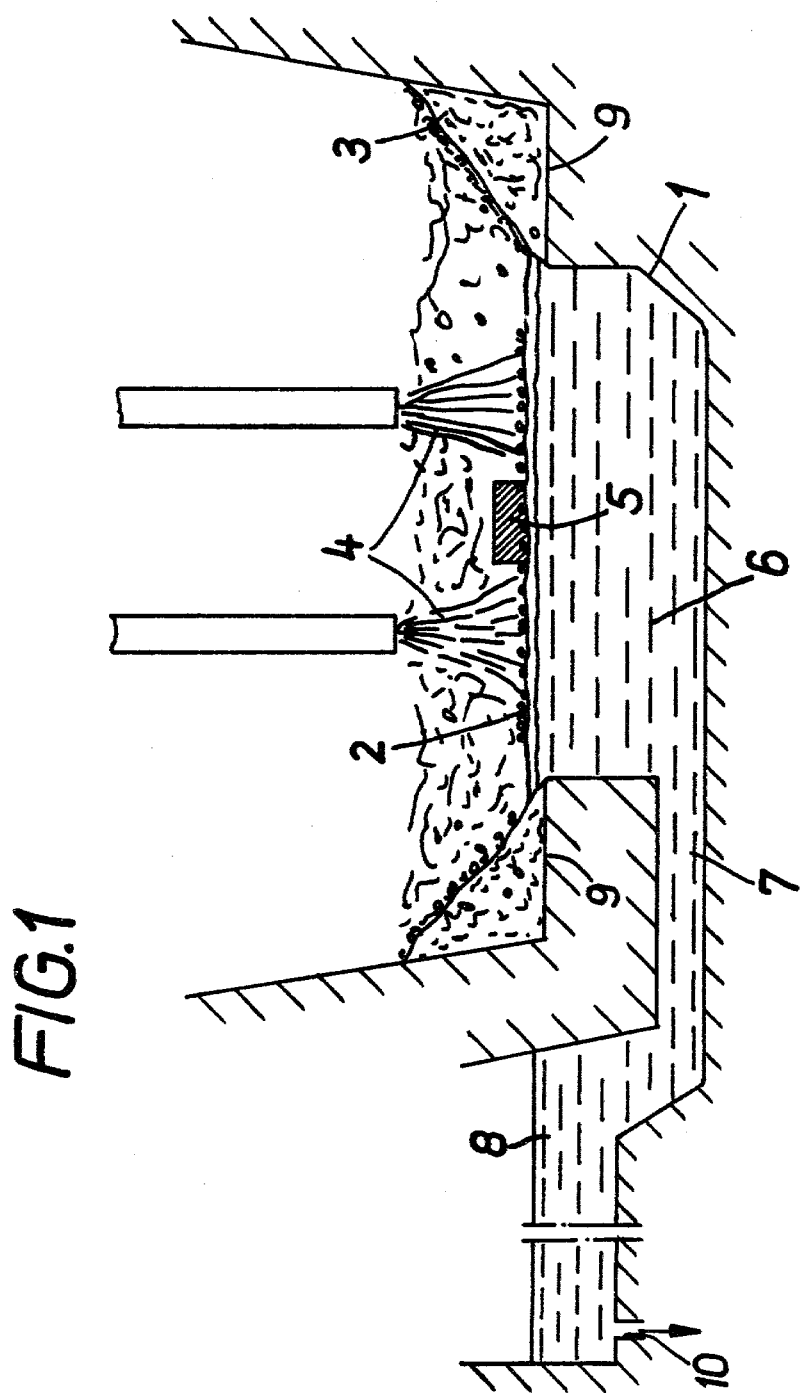
FIG. 1 shows a furnace arrangement, containing two plasma burners, for practicing the method of the present invention.

Referring now to the drawing, there is shown in FIG. 1 a melting vessel in the form of a melting furnace 1 which contains a metal bath comprised of liquid metal 6. The metal bath has a bath surface 2 formed by a thin layer of slag. As shown in FIG. 1, melting furnace 1 has a ledge 9. Sponge metal is fed into melting furnace 1 through feed pipes or nozzles (not shown) which direct the sponge metal directly onto the bath surface 2. The initial feeding of the sponge metal into the melting furnace causes a fill ramp of sponge metal to be formed on ledge 9 of melting furnace 1, and further feeding of the sponge metal deposits additional sponge metal on fill ramp 3, which additional sponge metal as described below, is melted and reaches the liquid metal bath 6.

In the embodiment shown in FIG. 1, two plasma burners 4 which produce cone-shaped plasma streams do the melting. The feed pipes, which can be oriented vertically or at an angle to the horizontal, or nozzles bring the sponge metal into the effective range of the plasma burners. The solid sponge metal, such as sponge iron, is charged to bath surface 2 in such a manner that a thin floating layer of solid sponge metal is formed on the melt in the area where the plasma streams impinge, the thin layer of sponge metal is melted there, and the melted sponge metal then sinks into the metal bath in the form of metal drops. Due to the cone-shaped propagation of the plasma stream, such an introduction of the sponge metal does not pose any difficulties. The sponge iron charged onto the ramp 3 melts on its surface due to lateral irradiation by the plasma streams, and flows into the metal bath. Thus, both the sponge metal which is fed directly onto the surface of the metal bath and that which is deposited on fill ramp 3 are melted directly by the gas plasma and reach the melt only in liquid state. Advantageously, the melting of the sponge metal which is on fill ramp 3 can also be effected in such a way that the plasma streams directly pass over and impinge on the sponge metal which is on fill ramp 3.

The melting of the sponge metal separates the metal from its matrix and produces a slag from the separated matrix.

The slag produced from the matrix is continuously discharged through discharge opening 5. Discharge opening 5 is provided in such a manner that only a very thin layer of slag will be found on the metal bath.

The liquid metal 6 formed in melting furnace 1 is transferred to a second vessel 8 through a discharge opening 7 at the bottom of melting furnace 1. Second vessel 8 has a discharge opening 10 at its bottom.

Figure 2:
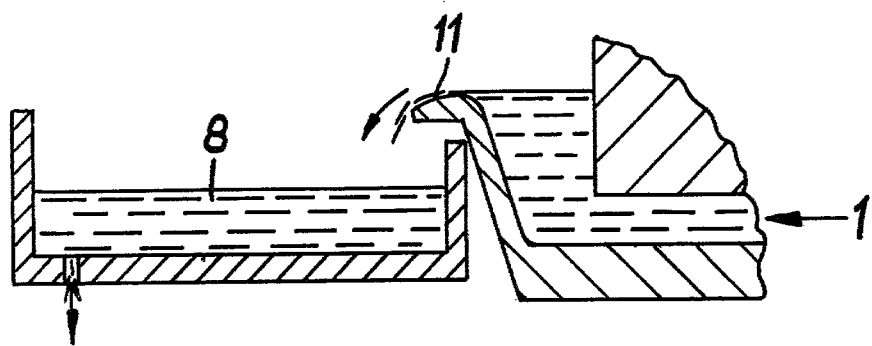
FIG. 2 shows an alternate embodiment of a furnace having an overflow which leads to a second vessel, and which can be used to practice the method of the present invention.
Figure 3:
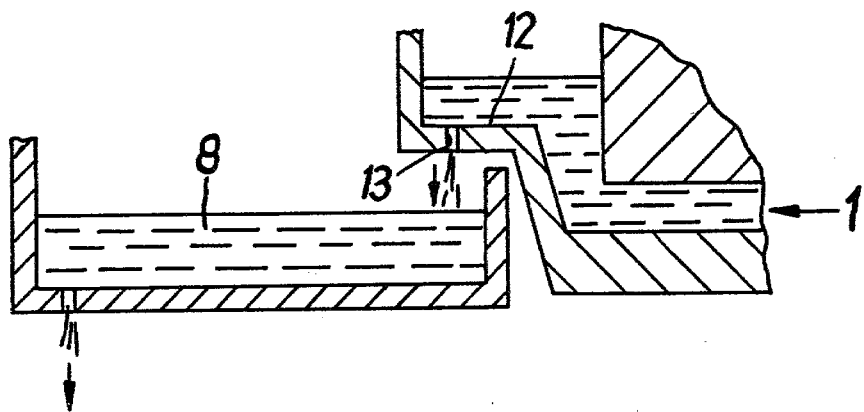
FIG. 3 shows another embodiment of a furnace having an overflow which leads to a second vessel, and which can be used to practice the method of the present invention.

If for space or practical reasons the arrangement shown in FIG. 1 can not be used, the overflow configurations shown in FIGS. 2 and 3 may be of use.

In the embodiment of FIG. 2, melting furnace 1 contains an overflow threshold 11 for discharging liquid into second vessel 8. In the embodiment of FIG. 3, melting furnace 1 contains an overflow section 13 which has a discharge opening 13 at its bottom.

EXAMPLE

In a practical embodiment for practicing the method of the present invention, an apparatus similar to that shown in FIG. 1 was employed, but the melting furnace was provided with only one plasma burner and without a lateral fill ramp 3. Moreover, the steel was not discharged from the second vessel through a discharge opening. Instead, the second vessel was trough-shaped and had a threshold at its end, and the steel flowed over the threshold of the trough-shaped second vessel into a casting mold. The level of the metal bath in the melting furnace was thus determined by the height of the threshold in the second vessel, which lay 0.7 cm below the lower edge of the discharge hole in the melting furnace. This assured a low level of slag above the surface of the metal in the melting furnace.

The sponge metal was introduced through an annular gap in the furnace cover disposed in a circle around the plasma burner itself so that the sponge metal dropped onto the bath surface in the area of impingement of the plasma cone. The furnace gas produced during melting was extracted through the slag discharge hole of the melting furnace.

During a test run, sponge iron of the following composition was used.
$Fe_{total}=92.1\%$
$Fe_{metal}=86.2\%$
$C=1.5\%$
$P=0.023\%$
$S=0.02\%$
$SiO_2=1.9\%$
$Al_2O_3=0.8\%$
$CaO=0.4\%$
$MgO=0.4\%$ Once the melting furnace had reached a thermally stationary state, the melting output at a steel temperature of 1620° C. was 2.8 tons sponge iron per $m^2 \cdot h$. In the second vessel, a deoxidation alloy of 20% Si, 20% Mn, remainder Fe was added continuously at a supply rate of 8.2 kg/t of sponge iron. The following values determined by way of analysis of steel samples drawn from the second vessel at intervals of 30 minutes reflect the surprisingly high degree of desulfurization as well as dephosphorization.

|  | % C | % Si | % Mn | % P | % S |
|---|---|---|---|---|---|
| First sample | 0.35 | 0.14 | 0.15 | 0.008 | 0.004 |
| Second sample | 0.35 | 0.13 | 0.15 | 0.009 | 0.003 |
| Third sample | 0.34 | 0.15 | 0.17 | 0.009 | 0.003 |
| Fourth sample | 0.35 | 0.14 | 0.17 | 0.009 | 0.003 |

In detail, the degree of desulfurization was 86% and the degree of dephosphorization was 94%. Ninety-nine percent of the iron was recovered which is a result of the low Fe content of the slag (4.2%). The deoxidation agent that was added permitted the advantageously high recovery rate of 87% Mn and 78% Si.

It will be understood that the above description of the present invention is susceptible to various modification, changes and adaptations, and the same are intended to be comprehended within the meaning and range of equivalents of the appended claims.

What is claimed is:

1. In a method for producing steel by refining raw sponge iron material containing a matrix of impurities and sponge iron with the use of a gas plasma formed by a plasma burner, in a melting vessel containing a metal bath, the sponge iron being fed into the melting vessel, the improvement comprising the steps of:

(a) feeding the sponge iron material into the melting vessel by forming a thin floating layer of sponge iron material on the surface of the metal bath, (b) directly melting by the plasma the sponge iron in the sponge iron material that is fed into the melting vessel without the addition of base or acid substances, and (c) continuously removing from the metal bath slag produced from the melting of the sponge iron.

2. The method as defined in claim 1 comprising melting said sponge iron with a plasma cone that covers the entire surface of said metal bath.

3. The method as defined in claim 1 further comprising treating said molten iron with a deoxidation and/or alloying means in a second vessel which is connected with said melting vessel.

4. The method as defined in claim 3 further comprising automatically controlling the process of steel production based upon measurements of properties of said molten iron in said second vessel.

5. The method as defined in claim 4, wherein said measured property is temperature.

6. The method as defined in claim 4, wherein said measured property is oxygen potential.

* * * * *